Oct. 19, 1937.　　　　G. W. LANE　　　　2,096,283
TENTER CLIP
Filed Jan. 14, 1935　　　2 Sheets-Sheet 1

Inventor
G. W. Lane
By Clarence A. O'Brien
Attorney

Oct. 19, 1937.    G. W. LANE    2,096,283
TENTER CLIP
Filed Jan. 14, 1935    2 Sheets-Sheet 2
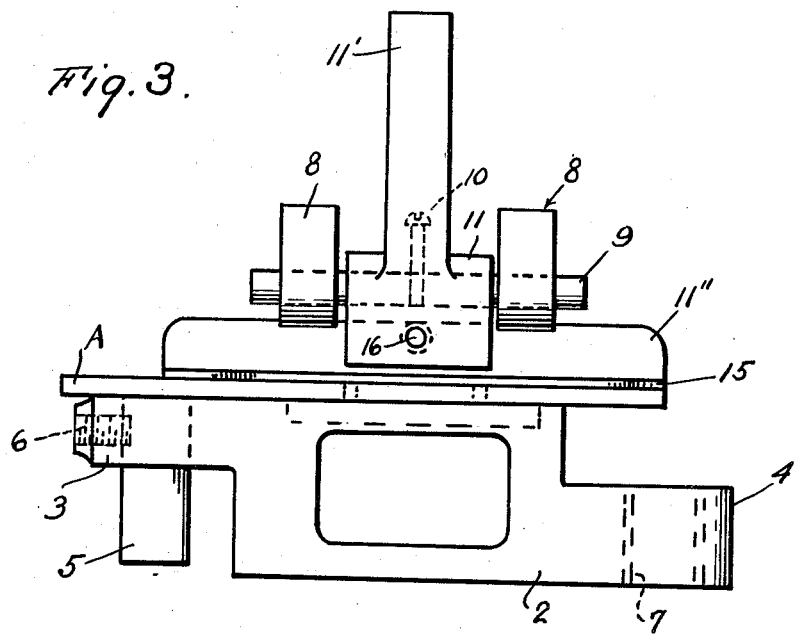
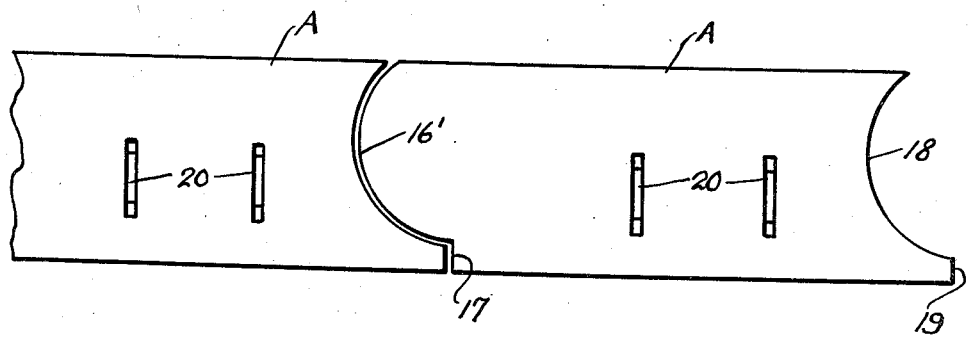
Inventor
G. W. Lane
By Clarence A. O'Brien
Attorney Patented Oct. 19, 1937

2,096,283

UNITED STATES PATENT OFFICE 2,096,283

TENTER CLIP

George W. Lane, Clifton, N. J.

Application January 14, 1935, Serial No. 1,775

3 Claims. (Cl. 26—61)

This invention relates to tenter clips. A tenter clip forms one unit in each of a pair of endless linked systems and it usually comprises a supporting structure having an arm projecting upwardly and then diverted laterally and a gate oscillatory around a horizontal axis in the diverted part of the arm. When the gate is in one position, or open, the clip may receive the cloth between its gripper and a surface of said structure; when the gate is in the other position, or closed, the cloth is gripped between the gripper and said surface. With the clip is usually associated a feeler overlying a slot or other aperture in said surface and controlling the closing of the gate, to wit, it rests on the cloth as the gate approaches its closed or gripping position, permitting its closing only when, in the action of the tenter clip system, the clip retracts from the cloth sufficiently so that the gripper will act to grip the cloth more or less only at its very edge. In any event, in the endless travel of the clip as a part of the mentioned system its gate is opened when the clip approaches the cloth, is then allowed by gravity to close to grip it, is then opened to free it, and is then allowed again by gravity to close—four movements in the circuit. According to this invention the gate undergoes only two movements in the circuit, i. e., first to closed position to grip the cloth and then to open position to free it, remaining open until it again approaches the cloth to grip it, whereby, in view of the great number of clips in a tentering machine, the noise and clatter incident to their operation and the wear and tear on their gates and the parts active to open them are reduced one half and there are other advantages evident to those skilled in the art. This is accomplished by forming the gate opposite to the portion thereof which includes the gripper with a portion in which the center of gravity of the gate is located and by adapting said structure to confine the movement of the gate between such limits that in its movement from either limit to the other said center of gravity must pass the perpendicular plane of and over the pivoting axis of the gate. In the example herein set forth the feeler further forms a part of the portion of the gate having the gripper.

In describing the invention in detail, reference will be had to the accompanying drawings wherein like characters denote like or corresponding parts throughout the several views, and in which:

Fig. 3 is a front view of the device.

Fig. 4 is a fragmentary plan view showing a pair of the plates.

Figure 1:
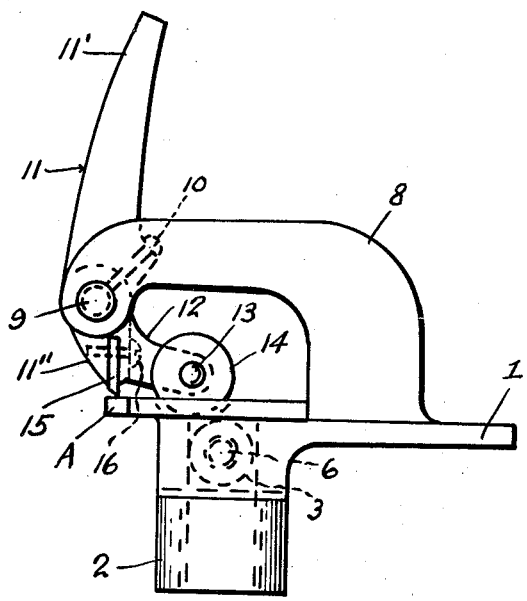
Fig. 1 is an elevation of the improved clip showing the balance gate assembly in closed position.
Figure 2:
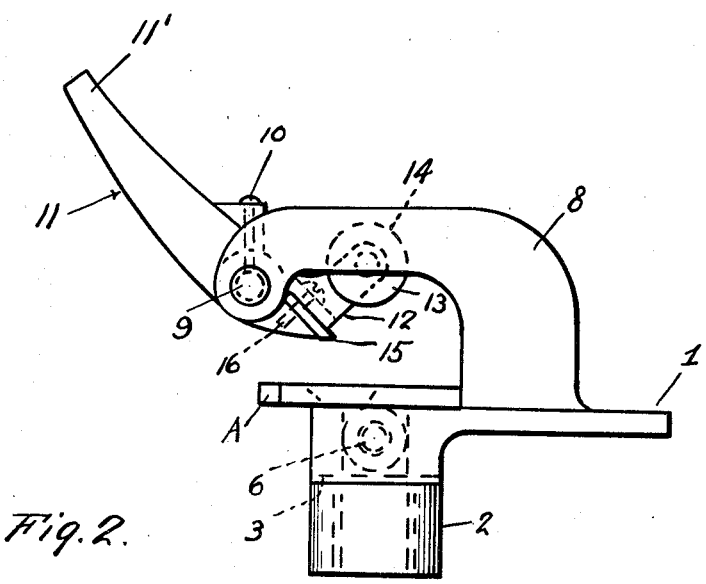
Fig. 2 is a similar view but showing the gate assembly in open position.

A base 2 having an extension 1 has projecting upwardly from said extension an arm 8 which is then diverted oppositely to said extension over the base and has its free end bent down. On the base under the arm is suitably secured a cloth-supporting plate A apertured at 20 (Fig. 4). A pin 9 is journaled in the end of the arm and by a screw 10 the gate 11 is affixed to said pin, said gate comprising a portion 11'', having fixed therein with the aid of a pin 16 a knife or gripper 15 to coact with the plate A to grip the cloth, and the relatively opposite portion 11'. Since the arm 8 has its free end bent down portion 11' may be made the heavier of said two portions of the gate; in other words, the center of gravity of the gate is in this portion 11'. The portion 11'' of the gate also here includes, to form a feeler, an arm 12 projecting toward arm 8, a transverse pin 13 therein and preferably non-rotative disks 14 on the pin and adapted to project into the apertures 20 of the plate A when the gate is fully closed (Fig. 1). The gate is limited in its movement in one direction by engagement of its gripper with plate A and in the other direction by contact of its gripper 15 (which is suitably elongated, Fig. 3) with arm 8.

What is material is that the gate has a portion, as 11', in which its center of gravity is located and that the supporting structure (formed by parts 2—1—8—A) confines the movement of the gate between such limits that in its movement from either limit to the other said center of gravity must pass the perpendicular plane of and over the pivoting axis (in pin 9) of the gate.

The base may be formed with terminal portions 3 and 4 the former higher than the latter, portion 3 having a depending pin 5 held therein by a screw 6 and portion 4 a hole 7; thus adjoining climps may have their terminal portions lap each other and pivotally connected by such a pin as 5 of one clip received in the hole 7 of the other. Plate A may be formed at one end as at 16'—17 and at the other as at 18 so that adjoining ends of adjoining clips may interfit. However these matters are not material.

I claim:

1. A tenter clip comprising, with supporting structure including a base having an upwardly facing cloth-supporting surface and an arm projecting upwardly and then diverted over said surface, a gate oscillatory around a substantially horizontal axis in the diverted part of the arm and including at one side of said axis a portion having a gripper and at the other side of said axis a portion in which the center of gravity of the gate is located, said structure confining the oscillatory movements of the gate between such limits that in the movement of the gate from either of said limits to the other said center of gravity must pass the perpendicular plane of and over said axis and the gripper being coactive with said surface to grip the cloth when the gate is approximately at one such limit.

2. A tenter clip comprising, with supporting structure including a base having an upwardly facing cloth-supporting surface and an arm projecting upwardly and then diverted over said surface, a gate oscillatory around a substantially horizontal axis in the diverted part of the arm and including at one side of said axis a portion having a gripper and, projecting toward said arm, a feeler and at the other side of said axis a portion in which the center of gravity of the gate is located, said structure confining the oscillatory movements of the gate between such limits that in the movement of the gate from either of said limits to the other said center of gravity must pass the perpendicular plane of and over said axis and the gripper being coactive with said surface to grip the cloth when the gate is approximately at one such limit, and said feeler being adapted to enter the aperture in said surface when the gate is at the last-named limit.

3. A tenter clip comprising, with supporting structure including a base having an upwardly facing cloth-supporting surface and an arm projecting upwardly from the base and then diverted over said surface, a gate oscillatory around a substantially horizontal axis in the diverted part of the arm and including a gripper engageable, on absence of cloth, with said surface to limit the movement of the gate in one direction when the gate moves in said direction and said structure limiting the movement of the gate in the other direction when the gate moves in the later direction, the center of gravity of the gate being at a point therein which moves over and past the vertical plane of said axis on movement of the gate in either direction.

GEORGE W. LANE.